US005323519A

United States Patent [19]

Cloud

[11] Patent Number: 5,323,519

[45] Date of Patent: Jun. 28, 1994

[54] FIFTH WHEEL PIN REMOVAL SYSTEM

[76] Inventor: Anthony L. Cloud, 746 Delverton Rd., Columbia, S.C. 29203

[21] Appl. No.: 955,125

[22] Filed: Oct. 1, 1992

[51] Int. Cl.$^5$ .................... B23P 19/04

[52] U.S. Cl. .................... 29/254

[58] Field of Search .................. 29/254, 255, 275, 270, 29/264; 81/52.3, 52.35; 411/389, 402

[56] References Cited

U.S. PATENT DOCUMENTS

| | | | |
|---|---|---|---|
| 1,662,538 | 3/1928 | Richmond et al. . | |
| 2,487,084 | 11/1949 | Weiss . | |
| 2,525,217 | 10/1950 | Glitsch | 411/389 |
| 2,572,370 | 10/1951 | Moeller . | |
| 2,779,089 | 1/1957 | Allen . | |
| 2,855,601 | 10/1958 | Hamlin . | |
| 3,492,906 | 2/1970 | Hauser | 411/389 |
| 3,519,087 | 7/1970 | Santi . | |
| 3,529,497 | 9/1970 | Brooks . | |
| 3,750,500 | 8/1973 | Peterson | 29/255 |
| 3,979,994 | 9/1976 | Collignon . | |
| 4,108,560 | 8/1978 | Minogue | 411/389 |
| 4,478,204 | 10/1984 | Kocsan | 29/254 |
| 4,690,365 | 9/1987 | Miller et al. | 411/389 |
| 5,075,947 | 12/1991 | Jessup et al. | 29/254 |

FOREIGN PATENT DOCUMENTS 23407 of 1906 United Kingdom .................. 411/389

*Primary Examiner*—Robert C. Watson

*Attorney, Agent, or Firm*—Michael A. Mann

[57] ABSTRACT

A removal system for a pin that connects a fifth wheel of a tractor to the tractor frame. The pin is modified by threading a hole in one end that receives a bolt on a washer; the washer when attached to the pin by the bolt prevents transverse movement of the pin in a first direction. The other end of the pin has another washer for preventing transverse movement in the opposing direction; that end of the pin couples to the end of rod on which is slidably carried a weight. The distal end of the rod has a stop. When the bolt and washer are removed from the first end and the weight is slung by a handle connected to the weight by a chain, the weight hits the stop which transmits the impulsive force along the rod to pin hammering it in the first direction. Depending on how tightly the pin is held in place, several attempts to hammer the pin out may be necessary, but while doing so the hands of the user are removed from the fifth wheel area.

7 Claims, 3 Drawing Sheets

FIFTH WHEEL PIN REMOVAL SYSTEM

BACKGROUND OF THE INVENTION

1. Field of the Invention

The present invention relates to pins for use in holding "fifth" wheels to tractor frames. More particularly, the present invention relates to apparatus for facilitating the removal of pins when the fifth wheel is to be removed for servicing or repair.

2. Discussion of Background

A considerable amount of goods is hauled by tractor-trailer rigs. Tractors will haul different trailers depending on the shipping requirements. For example, one tractor may haul a first trailer to a customer's facility to pick up a part of a load; then a second tractor may haul that trailer to a second facility for the remainder of a full load before departing with it to a distant terminal. At that terminal, the trailer may be left for unloading and the tractor assigned to haul a second trailer on the return leg of the trip.

A tractor carriers behind the cab a "fifth" wheel for connection to a trailer. The fifth wheel is not a wheel but rather a generally round, inclined, and pivotable metal disk with a funnel-shaped slot in it that receives a kingpin of a trailer (see FIG. 1). As the trailer's kingpin moves into the slot, it will push on a mechanism on the underside of the fifth wheel that operates to secure the pin in the fifth wheel.

From time to time, the fifth wheel requires servicing. To remove the fifth wheel, a pivot pin holding the wheel to the frame of the tractor is removed first. Because of the location of this pin under the wheel and near its lower end and because of the weight of a fifth wheel, removing this pin is difficult and injuries frequently occur.

It is an object of the present invention to make removal of this pin easier so the likelihood of injury is reduced.

SUMMARY OF THE INVENTION

Broadly stating its major aspects, the present invention is an apparatus for use in removably securing a fifth wheel to a tractor frame. The apparatus comprises two components: a modified pin, and a slide hammer than connects to the pin. The pin has a first end and a second end. The first end is threaded to attach to a coupling at the end of a rod. The rod has a stop at the distal end and carries a slidable weight. A sling is attached to the weight so that, when the weight is slung against the stop, the impulsive force generated by the impact of the weight is transferred to the coupling and thereby the pin. Because the hands of the user are away from the fifth wheel, the chance of injury is reduced. Furthermore, the pin is connected through the coupling to the sling hammer and remains under control.

Additionally, the pin has a washer attached near the threaded end to prevent transverse movement of the pin in one direction but allowing transverse movement in the opposing direction. At the other end of the pin, a hole is drilled and tapped with threads so that a bolt and washer can be installed. The washer, held by the bolt, prevents movement of the pin in the opposing transverse direction until removed from the pin. These washers provide additional safety over cauter pins for assuring that the pin is not inadvertently removed.

A feature of the present invention is the sling hammer. The sling hammer enables an impulsive force to be initiated by movement away from, rather than toward, the pin and the fifth wheel. By doing so, the sling hammer results in the pin being pulled from its seating in the fifth wheel and keeps the user's hands away from the wheel. Also, the sling hammer avoids problems that occur when a regular hammer or mallet misses its mark because a sling hammer cannot miss.

Another important feature of the present invention is the coupling. The coupling enables the force transferred from the rod of the sling hammer to reach the pin and holds the pin once freed from the fifth wheel.

Still another feature of the present application is the removable washer. As stated above, a washer removably attached to one end and permanently attached to the other end of the pin provides better holding power than cauter pins.

Other features and advantages will be readily apparent to those of ordinary skill in the art from a careful reading of the detailed description of a preferred embodiment accompanied by the following drawings.

DETAILED DESCRIPTION OF A PREFERRED EMBODIMENT

Figure 1:
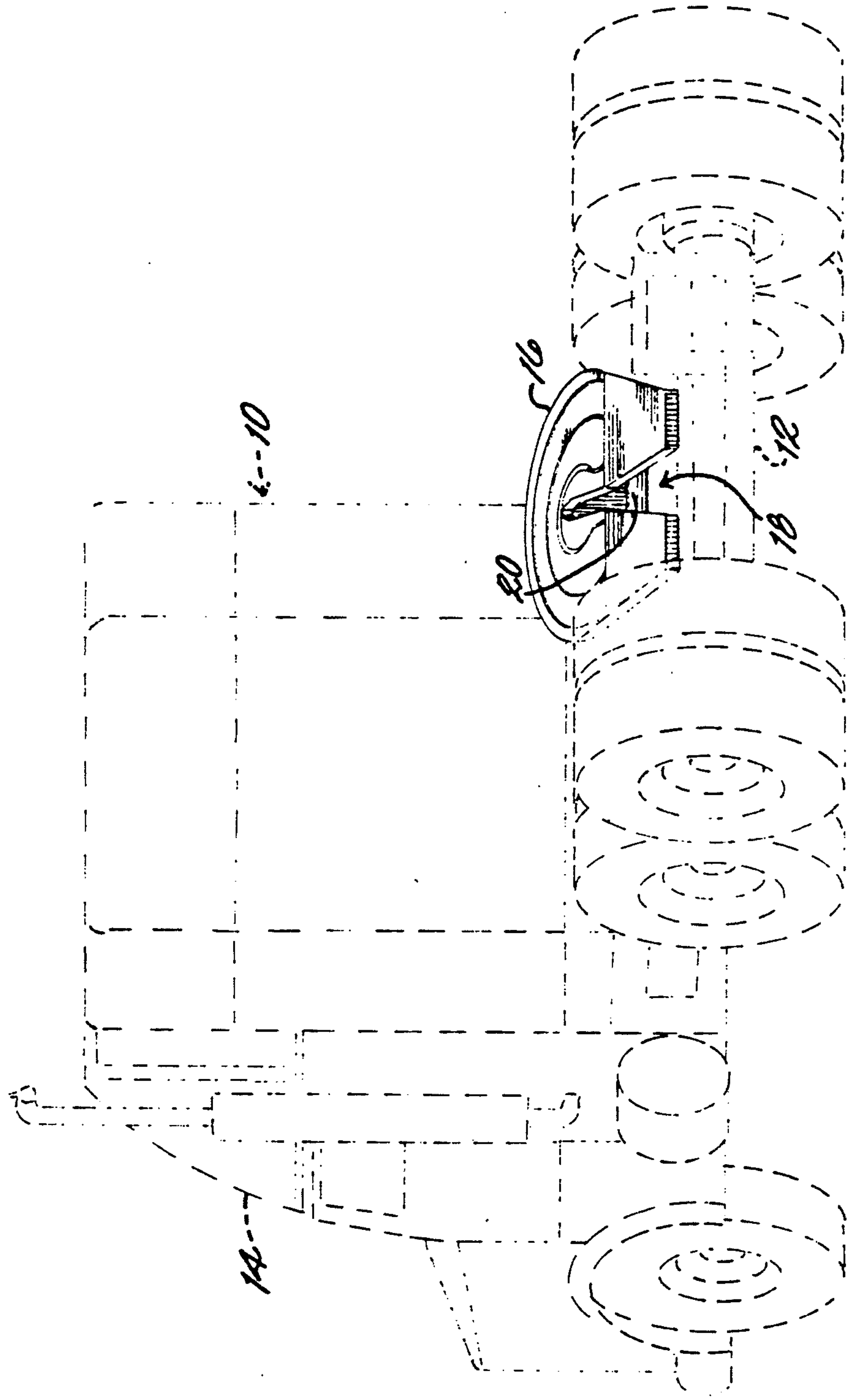
FIG. 1 is a perspective view of a fifth wheel in position on a tractor.

FIG. 1 illustrates the rear view of a tractor showing the "fifth" wheel. The tractor, generally indicated by the reference character 10, comprises a frame 12 and a cab 14 attached to frame 12. A fifth wheel 16 is carried by frame 12. Fifth wheel 16 has a slot with a funnel shaped entrance 18 for receiving the king pin (not shown) of a trailer. Fifth wheel 16 is pivotally mounted to frame 12 using a pin 20 that is in part the subject of the present application.

Figure 2:
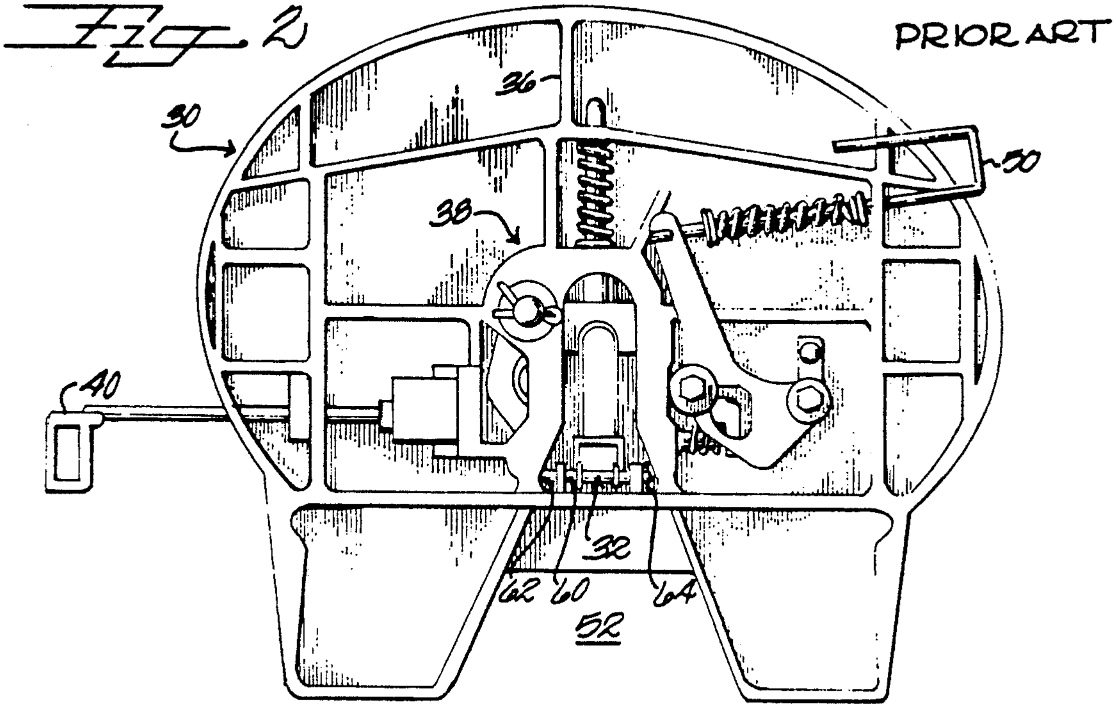
Fig. 2 PRIOR ART
FIG. 2 is a bottom view of a fifth wheel with a pin according to the prior art.
Figure 3:
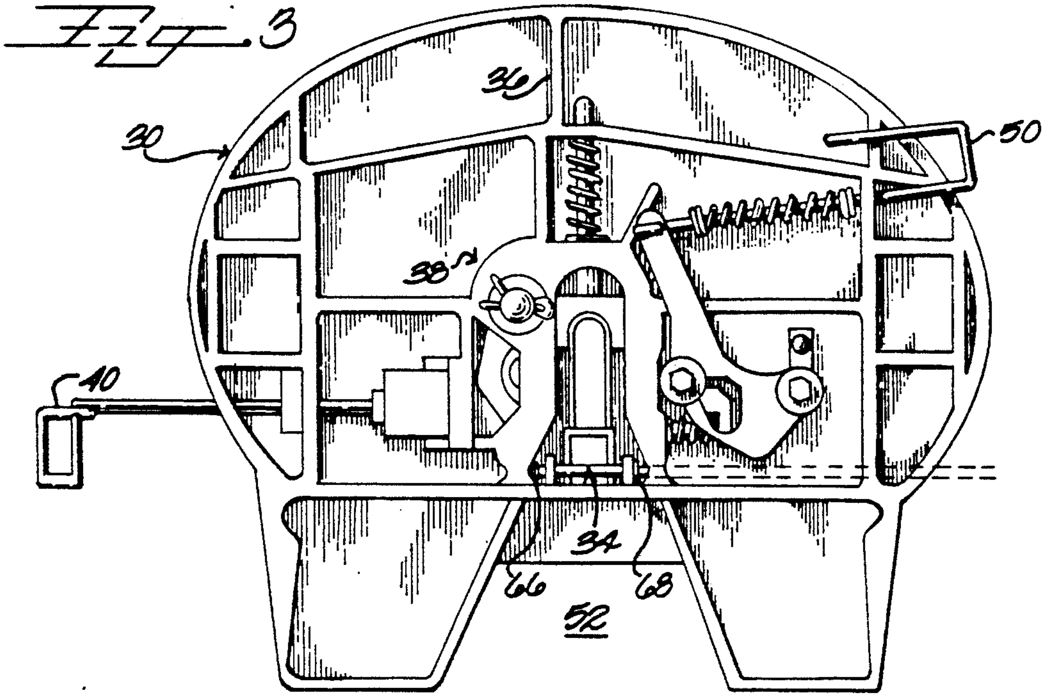
FIG. 3 is a bottom view of a fifth wheel with a pin according to a preferred embodiment of the present invention.

FIGS. 2 and 3 show the underside of a fifth wheel 30 with a pin 32 according to the prior art and a pin 34 according to the present invention. Fifth wheel 30 in both cases is identical and has integral reinforcing members 36 formed therein. Fifth wheel has a locking mechanism, generally indicated by the reference character 38, with a release mechanism 40 to unlock locking mechanism 38 and optionally a secondary lock 50. Locking mechanism 38 is moved from an unlocked position to a locked position by the movement of a king pin into slot 52 where it will engage locking mechanism 38 and produce a rotation or other movement of the components of locking mechanism to secure the king pin within slot 52 until release mechanism 40 is operated. There are a variety of locking mechanisms available from commercial sources. However, the present invention is not a fifth wheel or a locking mechanism but rather is independent of the type of locking mechanism and will work with any of them.

Pin 32 comprises a rod or bar 60 with a head 62 at one end to prevent movement in a first direction but not in a second direction, and a cauter pin 64 in a second, opposing end. Removal of cauter pin 64 allows pin 32 to be removed. However, because of the weight of fifth wheel 30 and the fact that pin 32 is on the underside of fifth wheel 30 near locking mechanism 38, the possibility of injury during removal is very high.

Locking pin 34 has a washer 66, 68 at each end, one washer 68 being removable, as will be described presently. Washers 66, 68 prevent transverse movement more securely than cauter pins and are less likely to become bent.

Figure 4:
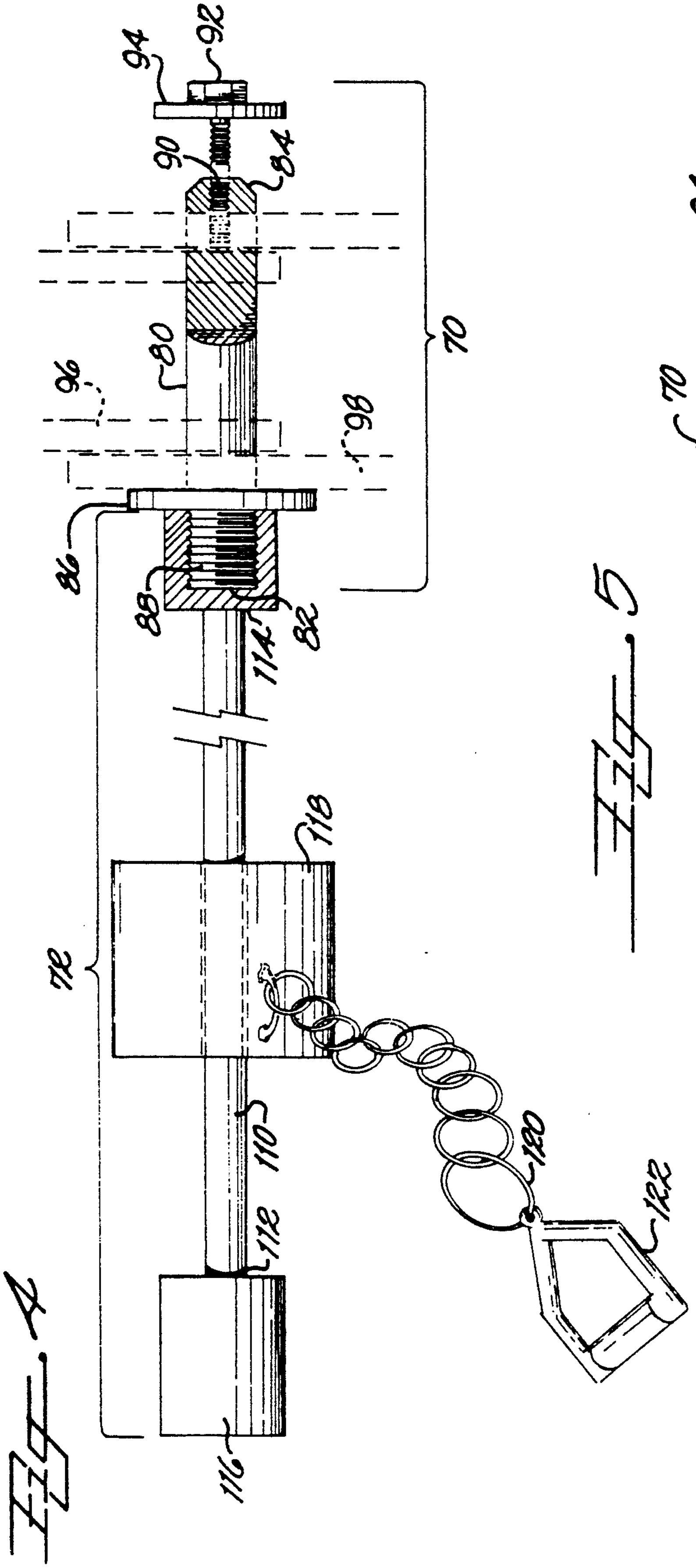
FIG. 4 is a side, partial cross sectional view of a pin removal assembly according to a preferred embodiment of the present invention.
Figure 5:
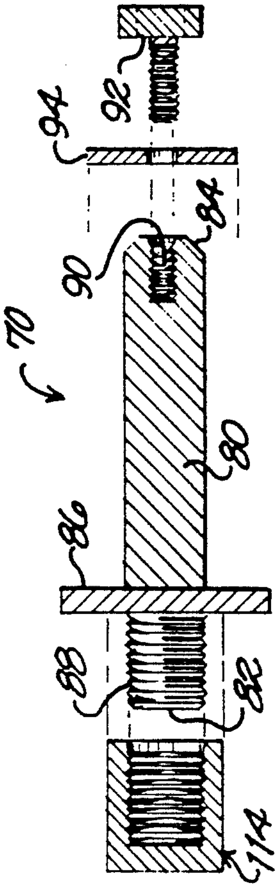
FIG. 5 is a detailed cross sectional view of the pin according to a preferred embodiment of the present invention.

FIGS. 4 and 5 illustrate the present invention in detail. The present invention comprises a pin assembly 70 and a hammer assembly 72. Pin assembly 70 further comprises a rod 80 with a first end 82 and a second end 84. First end 82 has a first washer 86 permanently attached to it near first end but spaced slightly inwardly of first end 82. The portion of first end outwardly of first washer 86 carries threads 88.

Second end 84 of rod 80 is tapered and has a hole 90 formed therein. Hole 90 is threaded to receive a bolt 92 that carries a second washer 94. When bolt 92 is threaded into hole 90, second washer 94 and first washer 86 will prevent transverse movement in both directions, first washer 86 preventing movement in a first direction but not a second direction and second washer preventing movement in the second direction but not the first. When in position, pin assembly 70 will secure fifth wheel 96 to frame 98.

Hammer assembly 72 comprises a rod 110 having a first end 112 and a second end 114. A coupling 116 is attached to rod 110 at first end 112 and a stop 116 attached to second end 114. A weight 118 is mounted onto rod 110 and slides freely from first end 112 to second end 114. Attached to weight 118 is a chain 120 with a handle 122. Using handle 122, weight 118 can be slung against stop 116 to produce an impulsive force transferred by rod 110 to coupling 116 and thus to pin assembly 70. Chain 120 need not be a chain but may be any flexible cord, rope, or other connector. Weight 118 must be freely slidable along rod 110. If desired, weight 118 can contain roller bearings.

One advantage of hammer assembly 72 is that weight 118 always hits stop 116 squarely, unlike an ordinary hammer that can miss. Another advantage of hammer assembly 72 is that the impulse pulls pin assembly 70 from its seating rather than pushes it out. Most importantly, hammer assembly 72 operates with the user's hands clear of the fifth wheel. Also, when pin assembly 70 is clear of its seating, it is held to hammer assembly 72 and does not escape control of the user.

In use, pin assembly 70 is put into position and can be driven home using hammer assembly 72 when coupling 116 is threaded to first end 82 of rod 80 by slinging weight 118 toward coupling 116. When pin assembly 70 is fully seated, bolt 92 is threaded to hole 90 in second end 84 to prevent pin assebmly from backing out. When it is desired to remove pin assembly 72, bolt 92 is unthreaded and coupling 116 threaded to first end 80 of pin assembly 70. Weight 118 is slung against stop 116 to impulsively remove pin assembly.

It will be clear to those of ordinary skill in the art that many modifications and changes can be made to the preferred embodiment described in the foregoing without departing from the spirit and scope of the present invention which is to be defined by the appended claims.

What is claimed is:

1. An apparatus for use in securing a fifth wheel to a tractor frame, said apparatus comprising:

a pin having a first end and a second end, said pin having a threaded hole in the said second end;

a first washer carried by said first end;

a second washer;

a bolt through said second washer, said bolt being threadingly received by said hole in said second end, said second washer preventing movement of said pin in said second transverse direction but not said first transverse direction when said bolt is threadably received in said hole of said second end;

a rod having a first end and second end;

means for attaching said second end of said rod to said first end of said pin;

a weight slidably carried by said rod;

a stop attached to said first end of said rod;

a handle; and mean for flexibly connecting said handle to said weight so that said weight can be slung by said handle against said stop.

2. The apparatus as recited in claim 1, wherein said pin has threads on said first end and said attaching means further comprises a hollow fitting having a threaded interior dimensioned to threadably receive said first end of said pin, said hollow fitting being attached to said second end of said rod.

3. The apparatus as recited in claim 1, wherein said connecting means is selected from the group consisting of a chain, a cord and a rope.

4. An apparatus for use with a fifth wheel secured to a tractor frame with a pin, said pin having a first end and a second end, said apparatus comprising:

a rod having a first end and a second end;

means for coupling said second end of said rod to said first end of said pin, said coupling means attachable to said pin;

a stop on said first end of said rod a weight slidably carried by said rod, said weight sliding freely between said coupling means and said stop;

means for slinging said weight between said coupling means and said stop, said weight imparting an impulsive force on said pin in a first transverse direction when said weight is slung toward said first end of said rod and said coupling means is attached to said pin.

5. The apparatus as recited in claim 4, wherein said pin has threads on said first end and said coupling means further comprises a hollow fitting having a threaded interior dimensioned to threadably receive said first end of said pin, said hollow fitting being attachable to said second end of said rod.

6. The apparatus as recited in claim 4, wherein said slinging means further comprises:

a handle; and a flexible connector having a first end attached to said handle and a second, opposing end attached to said weight so that said handle can sling said weight toward said second end of said rod.

7. The apparatus as recited in claim 4, wherein said second end of said pin has a threaded hole and said apparatus further comprises:

a washer;

a bolt through said washer, said bolt being threadably received by said hole in said second end of said pin, said washer preventing movement of said pin in a second transverse direction opposing said first transverse direction.

* * * * *